Oct. 28, 1958     F. H. TAYLOR     2,858,351
TEMPERATURE-MEASURING APPARATUS
Filed April 4, 1955     2 Sheets-Sheet 2
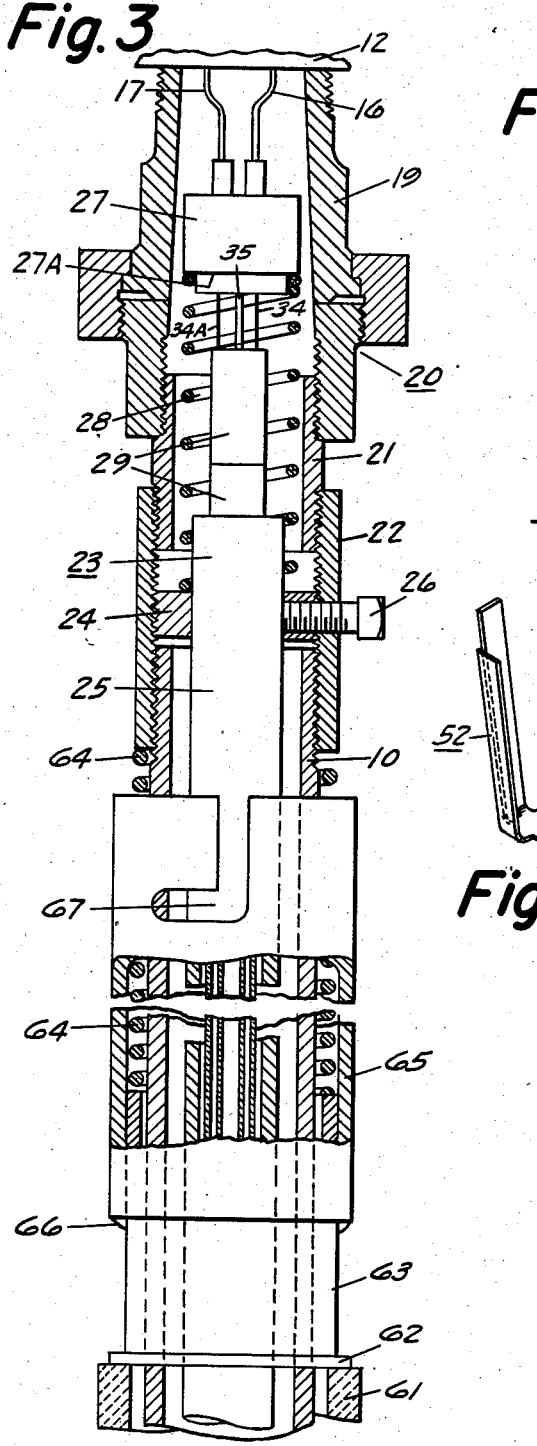
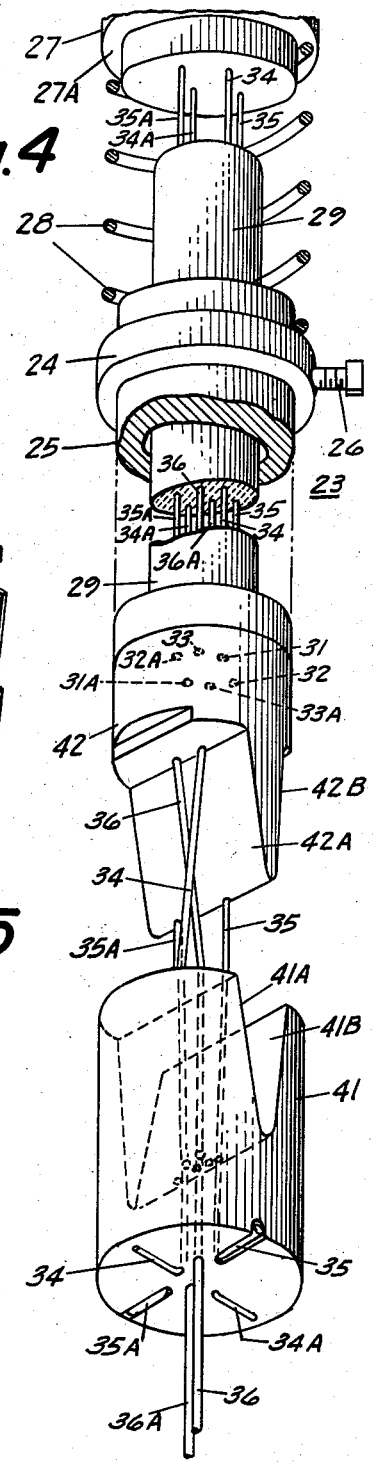

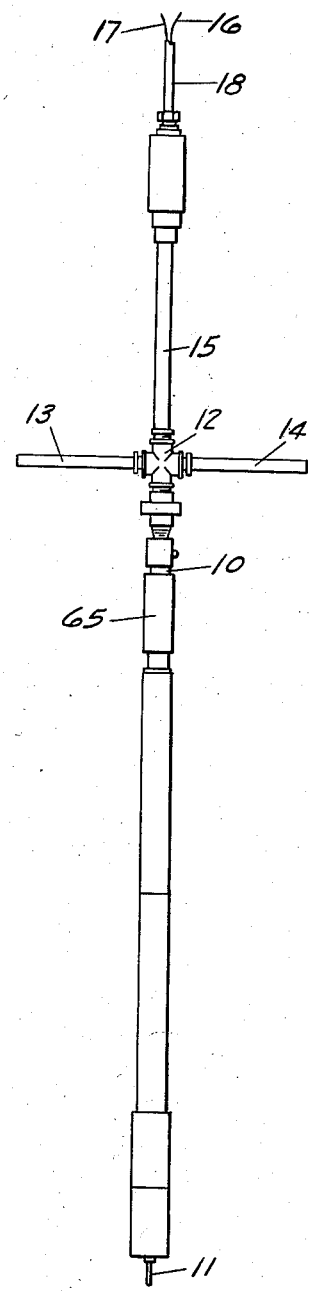
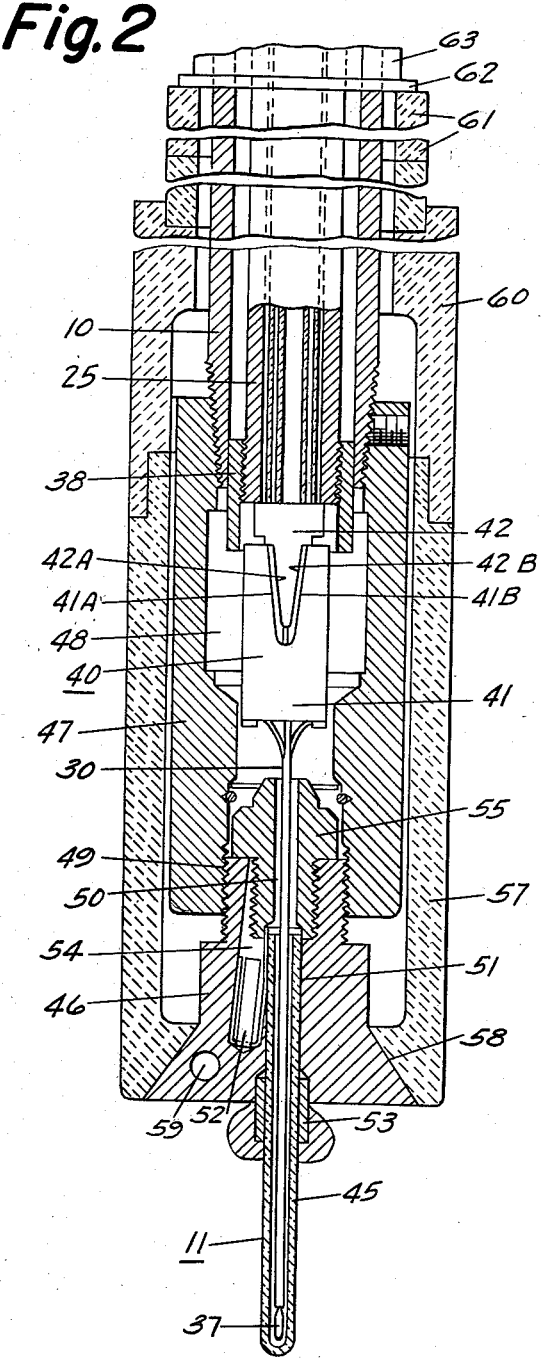

United States Patent Office 2,858,351
Patented Oct. 28, 1958

2,858,351
TEMPERATURE-MEASURING APPARATUS

Frank H. Taylor, Philadelphia, Pa., assignor to Leeds and Northrup Company, Philadelphia, Pa., a corporation of Pennsylvania Application April 4, 1955, Serial No. 498,960

9 Claims. (Cl. 136—4)

The present invention relates to temperature-measuring apparatus, more particularly immersion-type thermocouples, and has for an object the provision of improvements in immersion-type thermocouples used in measuring the temperature of molten metals and the like, said improvements providing increased accuracy, greater convenience and reliability of the thermocouple equipment.

The present invention provides improvements adapted for use in the immersion thermocouples disclosed in U. S. Letters Patent 2,732,416, granted January 24, 1956, upon a copending application of Robertson Serial No. 269,428, filed February 1, 1952.

In the construction of immersion type thermocouples used for measuring temperature of molten metals in the range of about 2700° to 2900° F., thermocouple elements such as platinum and platinum-rhodium are particularly susceptible to contamination when used for such high temperature measurement. The platinum-rhodium material is generally 10% or 13% rhodium and the remainder platinum. While such materials are quite stable at low temperatures, as the temperature is raised to the range indicated, the materials become increasingly more susceptible to contamination.

While previously known thermocouples have made provision for storing additional material for the sensing or measuring section of a thermocouple, the renewal of a contaminated or otherwise defective thermocouple junction has only been possible by disassembly of the thermocouple protective housing at the point where connection is made between the sensing or measuring leads and the compensating leads, or by mechanical manipulation of the stored wires, resulting in working or bending of the thermocouple material, to permit a new measuring junction to be formed. Where platinum and platinum-rhodium materials are used, the thermoelectric and mechanical properties are adversely affected by cold-working of the metal, as by bending and twisting. Accordingly, it is highly desirable to be able to renew the thermocouple junction with minimum mechanical working of the measuring materials. In accordance with still another aspect of the present invention, provision is made for renewing the measuring junction with minimum cold-working of the sensing materials, while retaining convenience and accessibility to the connections between the measuring section of the thermocouple and the extension section through which the thermo-electric potential is transmitted.

In practice, it has been found that with immersion thermocouples which are exposed to temperatures exceeding 2700° F., mechanical stresses are created within elements of the structure, particularly expansion and contraction of these elements. The expansion and contraction of the thermocouple elements, particularly of the terminal structure to which an electrical connection is made by the thermocouple wires and their associated lead wires, makes the instrument susceptible to open circuits and thereby affects the reliability of the instrument in obtaining a temperature measurement. More particularly, during the expansion of the terminal assembly, the pressure exerted by the terminal components against the thermocouple wires and the lead wires may be reduced to the point where the electrical contact is destroyed.

In another aspect of the present invention, provision is made to prevent open-circuiting between the thermocouple wires and their associated lead wires by provision of a connector or terminal structure having an associated resilient means exerting a pressure to maintain an electrical contact between the aforesaid wires regardless of the temperature attained at the connector assembly.

In yet another aspect of the present invention the connector assembly affords a quick, easy connection and disconnection between the thermocouple wires and their associated lead wires.

In a preferred embodiment, the connector or terminal structure is of male and female insulating structures having complementary surfaces between which the thermocouple wires and their associated lead wires are to be disposed. A resilient means associated with the connector applies a force which moves the insulating structures toward one another to establish and maintain an electrical contact between the thermocouple wires and their associated lead wires. With such an arrangement, it is only necessary to move the insulating structures apart and pull upon the exposed length of thermocouple wire to obtain an uncontaminated length thereof for forming a new hot junction.

It is desirable to position the measuring thermocouple in a protecting tube, such as a silica tube, for protection of the thermocouple measuring junction from a bath of molten material.

In order to facilitate the formation of a new hot junction, and further in accordance with the present invention, the silica-protecting tube is made readily removable from an end structure of the temperature-measuring apparatus. More particularly, the end structure is provided with a cavity for receiving the silica tube and a second cavity for receiving a resilient means, which resilient means extends into the first-mentioned cavity to engage and apply a lateral force against the silica tube to maintain it in position within the end structure.

For further objects and advantages of the present invention, reference is to be had to the following detailed description taken in conjunction with the accompanying drawings, in which:

Fig. 1 is an assembly view of an immersion thermocouple embodying the present invention;

Fig. 2 is an enlarged cross-sectional view of the lower end of the immersion thermocouple shown in Fig. 1;

Fig. 3 is an enlarged view partially in cross-section illustrating the upper portion of the assembly shown in Fig. 1;

Fig. 4 is an enlarged exploded view illustrating the quick connect and disconnect terminal structure; and Fig. 5 is an enlarged perspective view of a resilient means for maintaining the silica tube in position within the end structure of the measuring apparatus.

Referring now to the drawings, and more particularly to Fig. 1, there is illustrated an immersion thermocouple assembly of a type embodying the present invention, and which includes an elongated housing 10 arranged to support a thermocouple sensing or measuring element within a sensing or measuring extension, designated generally as 11. As shown, the housing 10 is supported by connection to a straight cross-pipe fitting 12 to which are connected handle members 13 and 14 and a pipe extension 15. Extension 15 is useful in manipulating the housing 10 for insertion into and removal from a molten metal bath as well as in providing a conduit for leads 16 and 17 in cable 18. As thus far described the immersion thermocouple is generically similar to that disclosed in the aforesaid Robertson application.

As shown in Fig. 3, the housing 10 is supported or connected to the cross-pipe fitting 12 through the male portion 19 of a pipe union 20, an externally threaded coupling member 21 and an internally threaded coupling member 22. The coupling member 22 provides threaded engagement between the upper ends of the pipe or housing 10 and through the externally threaded coupling member 21 to the female portion of the union 20. The coupling member 22 likewise provides a support for the thermocouple extension assembly designated generally by the reference character 23 by means of a ring member 24 threadedly engaging the coupling 22 and secured to the tube 25 by means of a set screw 26. For purposes of applying compression to a lower terminal structure 40 (Fig. 2) and of floatingly supporting the thermocouple extension assembly 23 within the tubing 25, there is provided an upper terminal block 27 and a coil spring 28 seated against a shoulder portion 27A of the block 27.

As shown in Figs. 2 and 3, the thermocouple extension assembly 23 comprises the upper terminal block 27, a plurality of electrical insulators 29, the lower terminal structure or connector 40 and a thermocouple measuring section which includes an insulator 30. The insulators 29 are provided with a plurality of axial or longitudinal bores 31, 31A, 32, 32A, 33, 33A (Fig. 4) through which are respectively passed extension lead wires 34, 34A, tie wires 35, 35A and thermocouple wires 36, 36A. Preferably the two tie or binding wires 35, 35A pass through diametrically opposite bores 32, 32A and are fastened at one end at terminal block 27 and at the other end at a female member 41 of the terminal structure or connecting block assembly 40. The connections at both ends are made by any convenient means, such as by crimping or bending the ends so that the terminal block, the connector assembly and the insulators form a unitary structure.

The spring 28 applies a tension force along the thermocouple extension assembly 23 that is transmitted along the tie wires 35, 35A extending from one end to the other of the assembly. The spring 28 is seated about the tube 25 and against a surface of the ring 24 and applies a tension force against the upper terminal block 27. In accordance with the present invention there is provided a space existing between an end of the uppermost insulator 29 and an underside of the upper terminal block assembly 27. This space is provided so that there may be relative movement between the insulators 29 and the tie wire interconnected female member 41 and terminal block 27, for a purpose hereinafter to be described.

In the arrangement illustrated in Fig. 4, the lead wires 34, 34A extend along the entire length of the thermocouple assembly 23 from the female connecting member 41 at one end and to an end of the terminal block 27 where connection may be made to the conductors 16 and 17 of the cable 18 (Fig. 1). Where the measuring elements of the thermocouple are comprised of platinum and platinum-rhodium, the lead wires respectively connected to these elements are comprised of platinum and platinum-rhodium. The wires 16 and 17 in such case would be compensating lead wires, one being comprised of copper and connected to the platinum-rhodium wire, the other being comprised of a copper-nickel alloy and connected to the platinum wire. The copper-nickel alloy is composed of 98% copper and 2% nickel.

In the structure illustrated, surplus thermocouple element wires 36, 36A are stored within the longitudinal bores 33, 33A of the insulators 29. With such an arrangement, new thermocouple measuring junctions may be provided upon contamination of the old junctions by cutting off the contaminated portion of the thermocouple element and drawing replacement material stored within the measuring device.

In accordance with the present invention, there is provided the terminal connector assembly 40 which assures that throughout the entire temperature range to which the thermocouple device may be exposed there will be maintained an electrical connection between the lead wires and their respective thermocouple elements. The improved terminal structure or assembly 40 also facilitates the withdrawal and ready reconnection of additional lengths of thermocouple wires without bending or twisting. The lack of mechanical manipulation of the wires avoids cold-working which adversely affects the mechanical and electrical properties of the thermocouple wire. In carrying out these features of the invention, the connector 40 is comprised of the female insulating structure 41 and the male insulating structure 42. These structures are provided with complementary surfaces 41A, 42A and 41B, 42B between which the thermocouple wires 36, 36A and their associated extension lead wires, or compensating lead wires 34, 34A are disposed. In the arrangement illustrated, the male connecting structure 42 is substantially wedge-shaped and the other connecting structure 41 has a complementary V-shaped notch.

One of the lead wires 34 and one of the thermocouple wires 36 are disposed along one of the surfaces 42A of the connecting structure 42 and the other thermocouple wire 36A and its associated lead wire 34A are disposed along an opposite surface 42B of the connector member 42. In this manner the thermocouple wires are maintained spaced and insulated one from the other.

In order to effect an electrical connection between the thermocouple wires 36, 36A and their associated lead wires 34, 34A, one of each of them may be placed to cross over the other associated wire in the manner shown. The connector structures 41 and 42 are then moved toward each other and a resilient force is applied against the thermocouple wires and their respective lead wires to effect an electrical connection. This resilient force is transmitted from the coil spring 28 along the tie wires 35, 35A to the female member 41 of the connector 40, which force moves the member against the other connector member 42. The male member 42 is seated against an end surface of the tube 25 and positioned within a ring 38 (Fig. 2) threadedly connected to that end of the tube.

Whenever it is desired to obtain additional thermocouple wire 36, 36A from its place of storage within the measuring device, it is only necessary to pull on the connector member 41 against the force of the spring 28 and away from the other connector member 42 to free the lead wires and the respective thermocouple wires from their mechanical and electrical connection. At that time, the thermocouple wires 36, 36A are free to move through the connector structure 40 and the desired length of wire may thus be obtained.

The measuring or sensing section 11 of the thermocouple assembly includes the thermocouple wires 36 and 36A joined at a measuring, sensing or "hot" junction 37. The thermocouple elements or wires 36 and 36A pass through the extension insulator 30 which abuts an end of the connector element 41, to make contact with the extension lead wires 34 and 34A disposed between the complementary surfaces of the connector elements 41 and 42.

The terminal or connecting assembly 40 permits the thermocouple elements disposed within the insulating blocks 29 to be pulled straight therefrom and an electrical contact to be re-established with minimum bending and minimum cold-working of the thermocouple materials, both matters of importance in temperature measurements.

Both the connector members 41 and 42 of the connector or terminal structure 40 are provided with a plurality of apertures passing longitudinally therethrough and which correspond substantially with similar apertures or bores 31, 31A, 32, 32A, 33, 33A passing through the insulators 29. At least two of the apertures of each of the members 41 and 42 are in alignment along the adjacent surfaces thereof. These aligned apertures accommodate the tie wires 35, 35A which in addition to transmitting force from the spring 28 also restrain the lateral movement between the members 41 and 42, thereby maintaining these elements in a desired aligned position.

The members 41, 42 may be comprised of any insulating material, either in whole or in part, capable of withstanding the temperature likely to be encountered in the particular application. Ceramic insulating materials have been found satisfactory for use in a device measuring the temperature of molten metal.

As shown in Fig. 2, the tubing 25 and the housing 10 are arranged readily to constrain the thermocouple extension assembly 23 at the lower end by permitting the male connector member 42 to contact the lower end of the tube or tubing 25. Coil spring 28 (Fig. 3) in addition to its aforesaid function of applying force to the connector structure 40 also permits differences in thermal expansion between the thermocouple assembly 23 and the tube or tubing 25 to take place without substantial disturbance in the position of the measuring junction 37 with respect to the tubing 25. As also described in the aforesaid copending application, any differences in length of tubing 25 and the assembly 23, due to difference in thermal expansion, result in greater or lesser compression of the coil spring 28 (Fig. 3). Since the measuring section from the junction 37 to the complementary surfaces of the connector elements 41 and 42 is relatively short, the position of the junction 37 is not greatly changed with respect to the tubing 25 with changes in temperature. A sleeve 38, threadedly mounted on the lower end of the tubing 25, provides a floating support for the tubing 25 with respect to the housing 10 by being in slidable contact with the inner surface thereof. By virtue of the floating supports, the differential thermal expansion of the housing 10, tubing 25 and the thermocouple extension assembly 23 is possible without inducing stresses or strains in any of these elements while at the same time there is provided a continuous force exerted upon the elements of the connector 40 to maintain electrical contact between the thermocouple wires and their associated lead wires.

The tubing 25 and the housing 10 are preferably made of the same material, in order to minimize their differential thermal expansion. Since the sensing or measuring junction 37 in silica tube 45 is definitely positioned with respect to the tube 25 and the silica tube 45 is definitely positioned, in a manner to be described, with respect to the housing 10 by means of an end portion or plug 46 and a plug-receiving element 47, relative motion of the thermocouple junction 37 with respect to the silica tube 45, due to thermal expansion or contraction, is minimized.

The plug-receiving element or sleeve 47 is provided with a bore 48 within which the connector structure 40 is positioned. The lower end of the terminal sleeve 47 is provided with a threaded bore 49 arranged to receive and secure the end closure plug assembly 46 through which the measuring section of the thermocouple assembly 23 passes by way of a bore or passageway 50.

The silica tube 45 forms a protective wall surrounding the thermocouple measuring junction 37. The silica tube 45 is received in a counter-bore 51 which is concentric with the bore 50 and maintained in its position therein in a manner now to be described.

During the course of obtaining temperature measurement it is desirable and often the procedure to replace the silica tube 45 after each and every temperature measurement. To facilitate the replacement of the silica tube 45, there is provided within the end closure plug 46 a resilient means 52 which applies a lateral force against a side wall of the silica tube 45 and thus frictionally retains it within the end closure. Thus, after each temperature measurement it is a relatively simple procedure to remove the silica tube 45 and replace it with another by merely sliding the tube from the counter-bore 51 against the frictional force of the resilient element 52.

To aid in the extraction of the silica tube 45 from the end closure 46, there may be provided a metallic sleeve 53 which can be grasped by a pair of pliers or the like and the sleeve 53 and the silica tube 45 withdrawn from the end closure 46 without danger of breaking the silica tube. Where the tube 45 has been broken during the course of temperature measurement, the metal sleeve 53 provides an extending portion which may be grasped to remove that portion of the tube 45 remaining within the end closure 46. The adjacent surfaces of the tube 45 and the sleeve 53 are coated with a refractory cement such as Alundum to form a bond between the sleeve and the tube and also to prevent molten metals from entering into the passage 50 and beyond.

The resilient retaining means 52 is preferably a multi-leaf spring structure of the type illustrated in Fig. 5. It may be made of a single piece of metal or several pieces of metal welded together. The spring 52 is seated within a cavity 54 formed in the end closure 46, which cavity opens into the cavity or counter-bore 51. The spring 52 is locked in its position within the end closure 46 by a center-bored internally threaded cap member 55 which is threadedly received by the end closure 46.

The spring 52 is provided with a leaf spring member 52A made longer than the other leaf spring portions and extending into the counter-bore 50 for engagement with a side wall of the tube 45. The leaf spring member 52A also locks the spring against rotation within its cavity caused by a twisting movement of the silica tube during its insertion or removal. Thus the member 52A is at all times positioned to be engaged by wall structure of the silica tube. The other leaves of the spring 52 engage wall structure defining the cavity 54 within the end closure 46.

The spring 52 may be made of any material having the property of retaining the characteristic of resiliency after being exposed to high temperatures. Where the thermocouple device embodying the spring structure is to be used in the measurement of temperatures in the range exceeding 2300° F., the spring structure may be made of a metal of deep-drawn temper and known by the trademark Inconel "X." The high temperature resilient retaining characteristics of this material may be improved by a method of heat-treatment now to be described.

The spring material is first subjected to a treatment which involves heating the material at a temperature of approximately 2100° F. for a period of from two to four hours. The material is air-cooled to ambient temperature and then subjected to high temperature aging, during which it is held at a temperature of approximately 1550° F. for twenty-four hours. Upon termination of the high-temperature aging, the material is air-cooled once more to ambient temperature and then subjected to low-temperature aging, at which temperature it is held at approximately 1300° F. for about twenty hours. After the low-temperature aging period has expired, the material is again air-cooled to ambient temperature and is ready for use in such high-temperature measurements as the temperature of molten steel in open-hearth furnaces.

It will be understood that the invention is not limited to the particular type of material used for the spring or to the method used in improving the high-temperature characteristics thereof.

The removal of the end plug 46 which threadably engages the sleeve 47 is accomplished in a manner described in the aforesaid copending application by a plug-removing means rendered accessible when a lower protective jacket 57 is moved upwardly by sliding the jacket away from engagement with the radially extending flanges 58 formed integrally with the plug 46.

The foregoing means comprises a structure engageable, if desired, by a tool for unscrewing the plug 46 from the sleeve 47. That structure comprises the walls of a hole 59 bored transversely through the body of plug 46 adjacent the flanged portion 58. Any elongated member (not shown), such as a screw driver may be used to loosen the plug for removal.

The insulating jacket 57 of refractory material preferably extends along the greater portion of the sleeve 47, and the upper end thereof is desirably formed with a rabbeted or interlocking joint complementary with a further jacket section 60 which enclose the upper portion of the sleeve 47 and a portion of the housing 10.

By so forming the ends of the jacket sections with overlapping complementary shapes, as the ends of sections 57 and 60, liquid-metal seals are formed to protect the housing 10 and the terminal portion thereof including sleeve 47 and plug 46. Referring now to both Figs. 2 and 3, the jacket section surrounding housing 10 includes a plurality of additional sections 61, which act to transmit a longitudinal thrust applied through an annular washer 62, sleeve 63 and coil spring 64 to bias the lower end of jacket section 57 into engagement with the shoulder section of plug 46. As shown, a biasing means, coil spring 64 is seated against coupling 22. For the purpose of removing the spring-biasing force on insulating jacket sections 57, 60 and 61, an outer sleeve member 65 is secured to sleeve member 63 as by weld 66. Sleeve 65 preferably surrounds coil spring 64 and is provided with a bayonet joint indicated as 67 which may be brought into engagement with lock screw 26 by retracting sleeves 65 and 63 to compress spring 64. Locking is accomplished by rotation of the sleeve member to bring the lower portion of bayonet joint 67 into engagement with screw 26. While the bayonet joint 67 is shown completely out of engagement with screw 26 for clarity of illustration, in practice sleeve 65 desirably will be sufficiently long so that the longitudinal or axial portion of bayonet joint 67 will at all times engage the screw 26 in avoidance of need to move the open end of slot 67 to the screw 26 and to prevent binding of sleeve 65 against screw 26 during contraction of assembly after heating or immersion.

In operation, when it is desired to renew or install a new thermocouple section within the silica tube 45 (Fig 2), the jacket sections 57, 60 and 61 will be retracted along the length of housing 10 by relieving the spring thrust produced by coil spring 64, Fig. 3, by upward movement of sleeve 65 so that the bayonet joint 67 is engaged and held by screw 26. With jacket section 57 so retracted, Fig. 2, the plug member 46 may be removed from sleeve 47 by insertion of a suitable tool into the aperture 59 threadably to disengage the plug 46 from the sleeve 45.

From the foregoing description, it will be apparent that upon removal of the end plug 46 and the sleeve 47, the terminal assembly or connector 40 will be exposed. A renewal section of thermocouple wire may be pulled from its storage within the measuring device by merely separating the connector members 41 and 42 to free the frictional engagement between the thermocouple wires and their associated lead wires and extracting the desired length of thermocouple wire necessary to form a new temperature-measuring junction. Ordinarily, the stored lengths of the thermocouple wires will be great enough (2 feet long) as compared with the length (about 6 inches) of the thermocouple from the connector 40 to the hot junction 37 to permit a number of replacements of the thermocouple.

While various modifications and changes in the foregoing embodiment of the invention will be apparent to those skilled in the art, all such modifications and changes as are within the scope of the appended claims are intended to be embraced thereby.

What is claimed is:

1. A connector for affording quick connection and disconnection between thermocouple wires and their associated lead wires, said connector comprised of male and female insulating structures, said male structure having a plurality of apertures passing longitudinally therethrough, said female structure having a plurality of apertures passing longitudinally therethrough, said structures having complementary surfaces upon which the respective apertures open, at least two of the apertures of each of said structures being in alignment along said complementary surfaces, restraining wire members received by said aligned apertures for preventing lateral movement between said structures, said male member having oppositely disposed surfaces along one of which is disposed a thermocouple wire and a lead wire crossed thereover and along the other of which is disposed another thermocouple wire and its associated lead wire crossed thereover, and means for transmitting a resilient force to one of said structures to move it toward the other one of said structures to establish contact by compression between each of said thermocouple wires and its associated lead wire at points along said complementary surfaces.

2. An immersion thermocouple device including a connector for affording connection and disconnection between thermocouple wires and their associated lead wires, said connector comprised of male and female insulating structures having complementary surfaces between which the thermocouple wires and their associated lead wires are to be disposed, wire structure passing through said connector structures and extending along said thermocouple device, and resilient means for transmitting a force along said wires to said connector structures to move said structures toward each other to establish by compression electrical contact between each of the thermocouple wires and its associated lead wire at points along said complementary surfaces.

3. The thermocouple device of claim 2 in which one of said connector structures is wedge-shaped having oppositely disposed inclined surfaces, one of said thermocouple wires and its associated lead wire disposed along each of said surfaces and crossing one over the other.

4. An immersion thermocouple device of the type in which contaminated thermocouple elements are replaced by forming new junctions from uncontaminated thermocouple material contained within the device, said device comprising an end structure through which said thermocouple elements extend, a silica tube surrounding the exposed portion of said thermocouple, said end structure having a cavity for receiving a portion of said silica tube, a spring structure adjacent an enclosed portion of said tube and positioned within another cavity opening into said first-mentioned cavity for applying a lateral pressure against said tube to maintain it within said end structure, said tube being readily removed to expose the thermocouple, a connector for affording a quick connection and disconnection between the thermocouple elements and their associated lead wires, said connector comprised of male and female insulating structures having complementary surfaces between which the thermocouple elements and their associated lead wires are disposed, and resilient means for applying a force maintaining said surfaces in juxtaposition to establish electrical contact between each of the thermocouple elements and its associated lead wire, said insulating structures being movable to release said thermocouple elements for movement so as to enable additional lengths of thermocouple elements to be withdrawn from said device upon removal of said silica tube for establishing a new uncontaminated hot junction.

5. A connector for providing readily renewable junctions between the thermocouple wires and lead wires comprising a first insulator having passages for carrying said thermocouple wires and said lead wires, said first insulator having a wedge-shaped portion extending from one end thereof and having said passages oriented to have one passage for said thermocouple wire and one passage for said lead wire opening on each side of said portion, a second insulator having a receiving cavity for said portion and passages for said thermocouple wire and said lead wire oriented to receive the respective wires after emergence from the passages of said first insulator and crossing of the respective thermocouple wires and lead wires on the surfaces of said portion, and spring means biasing said first and said second insulators into juxtaposition with said portion in said cavity to effect electrical contact between the interposed lead wires and the thermocouple wires at the points where the wires cross on the surfaces of said portion.

6. A connector assembly for effecting an electrical connection by compression between a thermocouple wire and its associated lead wire and between another thermocouple wire and its associated lead wire and comprising a pair of structures each having at least two insulated inclined surface portions, said surface portions of one of said structures being complementary to said surface portions of the other of said structures, said structures being movable toward and away from one another, at least one of said structures including means for guiding the thermocouple wires and the lead wires adjacent at least portions of said surfaces and in the direction of movement of said structures so to cause to be disposed along each of the surfaces of one of said structures one of the thermocouple wires and its associated lead wire crossing one over the other, and resilient means for moving said structures toward one another to effect separate electrical connection between one of the thermocouple wires and its associated lead wire and between the other thermocouple wire and its associated lead wire.

7. The connector assembly of claim 6 in which said one of said structures has a wedge-shaped portion providing said inclined surfaces and there is provided means for guiding the movement of said structures toward and away from one another to effect a connection and disconnection between the wires.

8. The connector assembly of claim 7 in which said guide means is comprised of at least two spaced wire structures passing at least partially through one of said structures and completely through the other of said structures and along which said last-mentioned structure is movable due to the force transmitted by said resilient means to effect connections between said thermocouple and lead wires.

9. The connector assembly of claim 6 in which said one of said structures is wedge-shaped providing oppositely disposed inclined surfaces.

References Cited in the file of this patent
UNITED STATES PATENTS

| | | |
|---|---|---|
| 446,655 | Arld | Feb. 17, 1891 |
| 2,259,649 | Maucher | Oct. 21, 1941 |
| 2,490,817 | Klingel | Dec. 13, 1949 |
| 2,595,057 | Cotter | Apr. 29, 1952 |
| 2,630,643 | Smithson et al. | Mar. 10, 1953 |
| 2,643,069 | Carlin | June 23, 1953 |
| 2,706,411 | Bircher | Apr. 19, 1955 |
| 2,714,197 | Wharton et al. | July 26, 1955 |